Feb. 25, 1958

J. R. PARSONS 2,824,974

RADIATION DETECTOR

Filed Aug. 14, 1953

INVENTOR
JOHN R. PARSONS
BY George Sipkin
J. W. Heintgen
ATTORNEYS

Feb. 25, 1958  J. R. PARSONS  2,824,974
RADIATION DETECTOR

Filed Aug. 14, 1953  3 Sheets-Sheet 2

INVENTOR
JOHN R. PARSONS
BY George Sipkin
J.H.Heintzen
ATTORNEY

Feb. 25, 1958  J. R. PARSONS  2,824,974
RADIATION DETECTOR
Filed Aug. 14, 1953  3 Sheets-Sheet 3
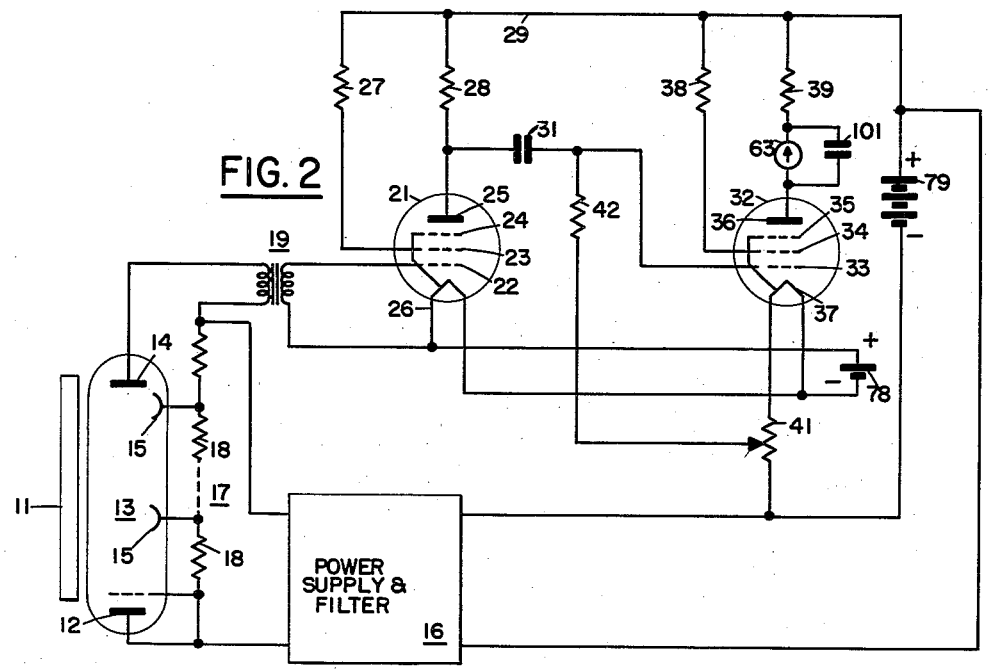
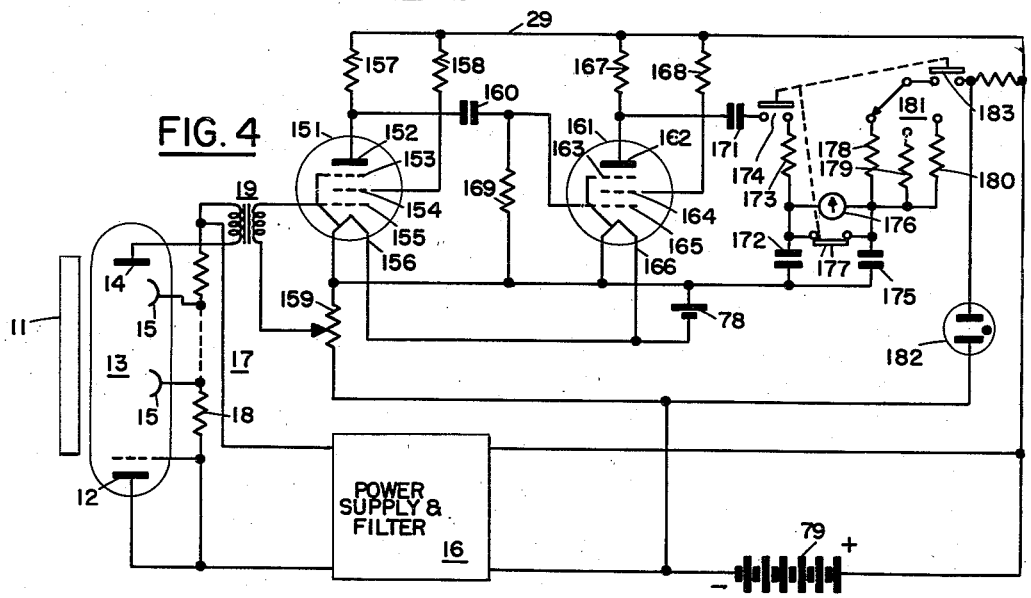
INVENTOR
JOHN R. PARSONS
BY *George Sipkin*
*G. K. Heintzen*
ATTORNEY

United States Patent Office 2,824,974
Patented Feb. 25, 1958

2,824,974

RADIATION DETECTOR

John R. Parsons, Pennsauken, N. J., assignor, by mesne assignments, to the United States of America as represented by the Secretary of the Navy Application August 14, 1953, Serial No. 374,458

8 Claims. (Cl. 250—207)

This invention relates to nuclear radiation detectors and more particularly to a compact battery-operated nuclear radiation detector having good sensitivity.

In the past, nuclear radiation detectors which utilized the sensitive photomultiplier tubes were operated from power lines because of the high voltages required. Portable battery-operated radiation detectors were relatively insensitive and subject to drift as their batteries aged.

It is an object of this invention to provide a new and improved nuclear radiation detector.

Another object of this invention is provide such a radiation detector which is compact and sensitive.

A further object of this invention is to provide such a radiation detector which may be battery-operated and is portable.

Other objects and advantages of the invention will hereinafter become more fully apparent from the following description of the annexed drawings, which illustrate a preferred embodiment, and wherein:

Fig. 2 is a schematic drawing of a modification of the circuit of Fig. 1;

Fig. 4 is a schematic drawing of a further modification of the circuit of Fig. 1.

Identical elements in the different figures of the drawing are designated by the identical reference numerals.

Figure 1:
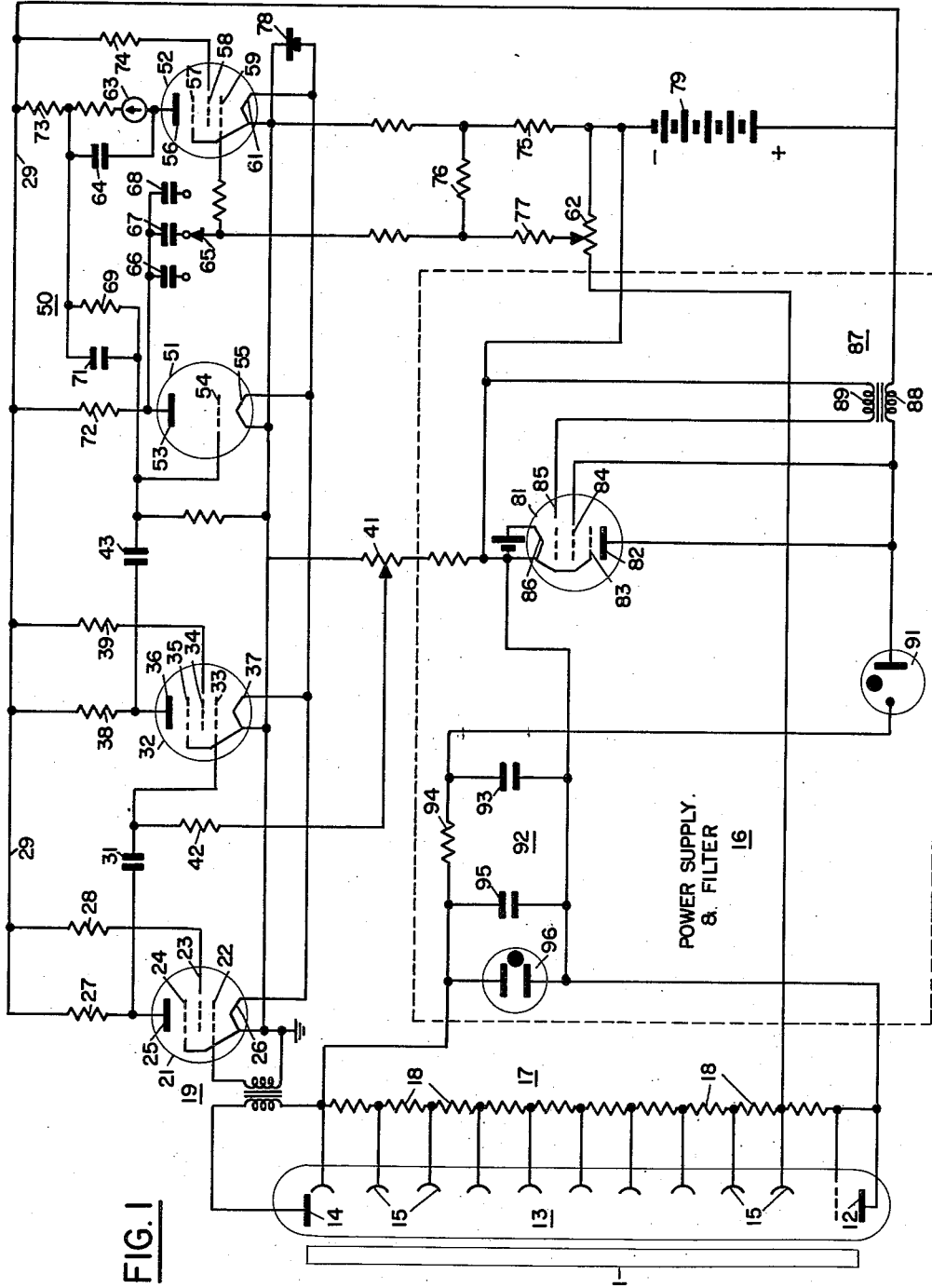
Fig. 1 is a schematic drawing of the basic circuit of this invention.

Referring now to Fig. 1, the reference numeral 11 designates a phosphor screen or transducer which emits light in response to nuclear radiation incident thereon. The light emitted by the screen 11 is proportional in amplitude to the energy of the incident radiation and is directed to impinge upon a photo-emissive cathode 12 of a photomultiplier tube 13 causing the cathode 12 to emit electrons which are attracted to an anode 14. Between the cathode 12 and the anode 14 are secondary emissive electrodes or dynodes 15 which amplify the current flow to the anode 14. Energy is supplied to the photomultiplier tube 13 by a power supply 16 which will be described in further detail later. A voltage divider 17 comprising resistors 18 is connected across the power supply 16 to provide the individual dynodes 15 with the proper operating voltages. The output from the photomultiplier tube 13 is coupled by an isolating transformer 19 to the control grid 22 of a pentode amplifier tube 21 which also comprises a screen grid 23, a suppressor grid 24, an anode 25 and a filamentary cathode 26. Energy is supplied from a high voltage line 29 to the anode 25 through an anode load resistor 27 to the screen grid 23 through a current limiting resistor 28. The output from the amplifier tube 21 is taken from the anode 25 and is coupled through a coupling capacitor 31 to the control grid 33 of a second pentode amplifier tube 32 which also comprises a screen grid 34, a suppressor grid 35, an anode 36 and a filamentary cathode 37. Energy is supplied from the high voltage line 29 to the anode 36 through an anode load resistor 38 and to the screen grid 34 through a current limiting resistor 39. A negative bias is supplied to the control grid 33 from the power supply 16 through a variable resistor 41 and a grid return resistor 42 enabling the pentode 32 to act as an amplitude discriminator and to reject all signals below a predetermined amplitude. The signal output from the amplifier 32 is taken from the anode 36 and is coupled through a coupling capacitor 43 to the input of a biased multivibrator 50.

The multivibrator 50 comprises a triode 51 which has an anode 53, a control grid 54, and a filamentary cathode 55, and a pentode 52 which has an anode 56, a suppressor grid 57, a screen grid 58, a control grid 59 and a filamentary cathode 61. To prevent the multivibrator 50 from oscillating freely, the pentode 52 is biased by a negative voltage taken from a potentiometer 62 and applied to the control grid 59. Connected in series with the anode 56 and shunted by an integrating capacitor 64 is a meter 63 which provides a count of the pulse output from the amplifier 32.

Any of three range capacitors 66, 67, or 68 may be connected into the circuit of the control grid 59 by a switch 65 to select the range of the instrument. A resistor 69 and a parallel capacitor 71 are connected from the anode 56 of the pentode 52 to the control grid 54 of the triode 51 providing a feedback path which prevents the triode 51 from conducting while the pentode 52 is providing a count. Energy is supplied from the high voltage line 29 to the anode 53 through an anode load resistor 72, to the anode 56 through an anode load resistor 73 and to the screen grid 58 through a current limiting resistor 74. A bias compensating network is provided in resistors 75, 76, and 77 to compensate for aging of the energy supply. The filamentary cathodes 26, 37, 55, and 61 are energized from a battery 78. High voltage is supplied to the high voltage line 29 from a battery 79.

Since the photomultiplier tube 13 requires a very high voltage for its operation, a high voltage power supply 16 must be provided. The power supply 16 comprises a pentode 81 which has an anode 82, a suppressor grid 83, a screen grid 84, a control grid 85 and a filamentary cathode 86, and which functions as a blocking oscillator to drive a transformer 87. The transformer 87 has a primary 88 and a secondary 89 which is connected back into the control grid 85 to cut off the pentode sharply and provide high voltage pulses across the primary 88. A gas-filled rectifier 91 is connected in series with the primary 88 and a capacitor-input filter 92 comprising an input capacitor 93, a series resistor 94 and an output capacitor 95 provides a high filtered direct voltage. A voltage regulator tube 96 serves to maintain this voltage constant. Energy is supplied to the blocking oscillator 81 from the battery 79.

In operation, radiations striking the screen 11 are converted into visible light which impinges upon the photo emissive cathode 12 to provide a current flow in the photomultiplier tube 13. The signal output of the photomultiplier tube 13 is in the form of pulses the repetition rate of which is proportional to the strength of the radiations. These pulses are transmitted through the isolating transformer 19 to the control grid 22 of the amplifier tube 21 where they are amplified and then fed into the voltage discriminator-amplifier tube 32. Since the voltage discriminator tube 32 is biased negatively, the input signal must be of at least a predetermined amplitude before the tube 32 produces an output. In this manner, the voltage discriminator 32 discriminates against dark current pulses, noise, and other unwanted distortion and passes only the amplified signal pulses which result from the radiations striking the screen 11. The output pulses from the voltage discriminator 32 trigger the multivibrator 50 and are counted. Since pentode 52 is biased to cut off, the triode 51 normally conducts, but when a negative triggering pulse is received, the triode 51 is cut off and the pentode 52 conducts. When the triggering pulse decays, the multivibrator 50 returns to its former condition wherein the pentode 52 is cut off. To enable the meter 63 to indicate the number of pulses from the pentode 52 as a steady reading rather than as a needle flick, an integrating capacitor 64 is provided in parallel to integrate the pulses transmitted through the meter 63. Range capacitors 66, 67, and 68 are each of a value different from the others so that the instrument may be used on different ranges of radiations, but it is to be understood that this invention is not limited to three ranges and that any number of range capacitors may be used.

The power supply 16 provides approximately 1000 volts for the photomultiplier tube 13. Energy for the power supply comes from the battery 79 which also supplies anode voltage for the amplifier and multivibrator tubes 21, 32, 51 and 52. The pentode 81 is connected as a blocking oscillator in which the transformer 87 induces a voltage on the grid 85 to cut off the tube sharply. When the tube is cut off sharply, a high voltage peak is induced in the primary 88 due to the rapid decay of the flux. The output of the oscillator is rectified by the cold cathode rectifier 91 and is filtered and integrated by the filter 92 to provide a high direct voltage for the photomultiplier tube 13.

The compensating network of resistors 75, 76, and 77 and potentiometer 62 provides the control grid 59 with a bias voltage from the photomultiplier tube 13 to compensate for variations in voltage due to aging of the battery 79. The voltage taken from the end of the photomultiplier supply is balanced with the bias voltage applied to the control grid 59 and as the voltage of the battery 79 decreases, the bias applied to the control grid 59 also decreases, thereby maintaining the current through the tube 52 relatively steady.

A modification of the circuit of Fig. 1 is shown in Fig. 2. In the circuit of Fig. 2, incident radiation striking the screen 11 varies the current flow in the photomultiplier tube 13 to produce pulses which are transmitted through the isolating transformer 19 to the control grid 22 of the amplifier tube 21 where they are amplified and fed into the heavily biased control grid 33 of the voltage amplifier-discriminator tube 32. The meter 63 is inserted in the circuit of the anode 36 to indicate the radiation intensity, thus eliminating the counter circuit 50 of Fig. 1. The energy and power supplies are the same as in the circuit of Fig. 1. A large value capacitor 101 is connected in parallel with the meter 63 to integrate the output pulses from the tube 32 and provide a steady reading.

In operation, the pulses, the repetition rate of which is proportional to the strength of the incident radiations striking the screen 11, are fed into the tube 32. Due to the threshold bias applied from the potentiometer 41 to the control grid 33, only pulses of a predetermined minimum amplitude produce an output from the tube 32. The pulses passing through the tube 32 each charge the capacitor 101 an amount which is proportional to the amplitude of the original radiations until the rate at which the capacitor 101 is being charged is equal to the rate at which it is being discharged through the meter 63. The meter 63 indicates the voltage across the capacitor 101 as an average value. The faster the pulses charge the capacitor 101, the higher the voltage across the capacitor will be since the rate of charge will be greater than the rate of discharge. The advantage of this type of instrument over the circuit of Fig. 1 is the elimination of the dead time between counts present in the counter circuit of Fig. 1.

Figure 3:
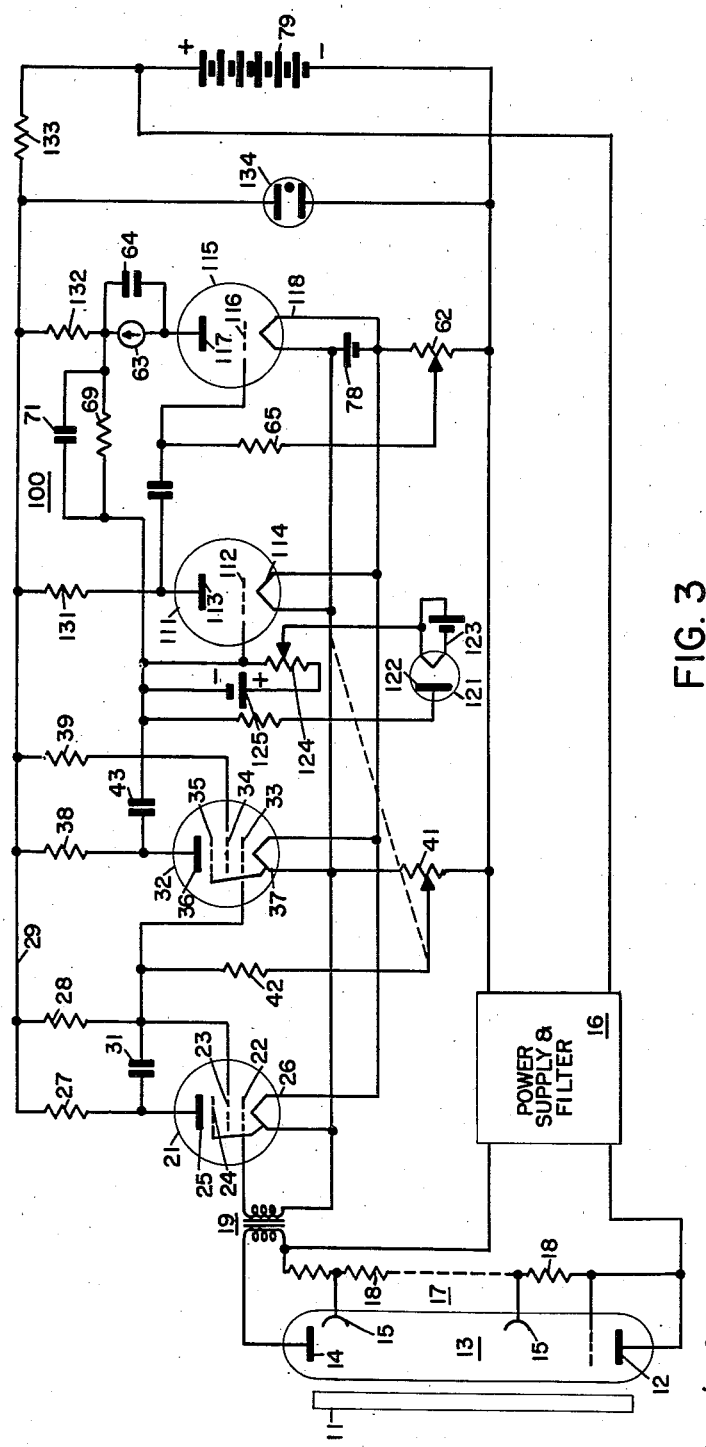
Fig. 3 is a schematic drawing of another modification of the circuit of Fig. 1.

A second modification of the circuit of Fig. 1 is shown in Fig. 3. In this figure the photomultiplier tube 13 and its circuit and the amplifier tube 21 and its circuit are identical to those of Fig. 1. The voltage amplifier-discriminator tube 32 and its circuit are modified only in the output from the tube 32. The output pulses from the tube 32 are transmitted through a coupling capacitor to the input of a multivibrator counting circuit 100 which comprises a triode 111 having a control grid 112, an anode 113 and a filamentary cathode 114 and a second triode 115 having a control grid 116, an anode 117 and a filamentary cathode 118. The triode 115 receives a bias voltage from a potentiometer 62 through a grid return resistor 65 so that the triode 111 is normally conducting. A diode rectifier 121 having an anode 122 and a filamentary cathode 123 is provided as an amplitude limiter connected from a potentiometer 124 in the circuit of the control grid 112 to the output circuit of the tube 32. A variable bias is supplied to the diode 121 from a battery 125. The potentiometer 124 is ganged with the potentiometer 41 so that the two may be adjusted simultaneously. Energy is supplied from the high voltage line 29 to the anode 113 through an anode load resistor 131 and to the anode 117 through an anode resistor 132. Energy is supplied to the high voltage line 29 from the battery 79 through a resistor 133 and is maintained constant by a voltage regulator tube 134.

This circuit makes use of a voltage limiter to restrict the size of the pulses fed into the counter circuit 100 to a predetermined value regardless of the amplitude of the incoming signals. The count of this instrument is an indication of the frequency with which the screen 11 is bombarded with radiations which is, in turn, an indication of the strength of the source of the radiations. The voltage limiting action is accomplished by the biased diode 121. If the incoming signals exceed a predetermined value, the diode 121 conducts providing a conductive path which is in parallel with the input to the triode 111 of the counter 100. Since the minimum value of the pulses transmitted through the instrument is determined by the voltage amplifier-discriminator tube 32, the addition of the diode limiter 121 allows the overall amplitude of the pulses reaching the counter 100 to be limited. As the minimum value of the pulses transmitted is determined by the setting of the potentiometer 41, so is the maximum value of the pulses determined by the setting of the potentiometer 124. Since the energy of the pulses has been limited, the meter 63 indicates only the number of pulses passing through it in a period of time without regard to the amplitude of the pulses.

A modification of the circuit of Fig. 1 which utilizes an accurate comparison circuit to indicate the strength of the radiation field is shown in Fig. 4. In this figure, pulses of a repetition rate proportional to the strength of the radiations to be detected are generated in the photomultiplier tube 13 and transferred through an isolating transformer 19 to a control grid 155 of a voltage amplifier-discriminator tube 151 which further comprises an anode 152, a suppressor grid 153, a screen grid 154 and a filamentary cathode 156. Energy is supplied from the high voltage line 29 to the anode 152 through an anode load resistor 157 and to the screen grid 154 through a current limiting resistor 158. A potentiometer 159 supplies a negative bias voltage to the control grid 155. The output from the tube 151 is coupled through a coupling capacitor 160 to a control grid 165 of an amplifier tube 161 which further comprises an anode 162, a suppressor grid 163, a screen grid 164 and a filamentary cathode 166. Energy is supplied from the high voltage line 29 to the anode 162 through an anode load resistor 167 and to the screen grid 164 through a current limiting resistor 168. A grid return resistor 169 connects the control grid 165 to the cathode 166. A coupling capacitor 171 connects a capacitor 172 to the anode 162 through a current limiting resistor 173 and a push button switch 174. A capacitor 175 is charged from the battery 79, and a meter 176, across which is connected a push button switch 177, compares the charge on the capacitor 172 with the charge on the capacitor 175. Resistors 178, 179 and 180 are connected in series between the capacitor 175 and the battery 79 by a selector switch 181. The voltage of the battery 79 is stabilized by a voltage regulator tube 182 and a push button switch 183 is connected in series with the battery 79 to prevent unnecessary drain. The push button switches 174, 177 and 183 are mechanically interconnected to operate simultaneously.

In operation, the pulses created in the photomultiplier tube 13 are transmitted to the control grid 155 by the transformer 19 as positive pulses. Due to the negative bias applied to the control grid 155, the tube 151 produces an output only when the amplitude of the pulses exceeds a predetermined minimum value which is determined by the setting of the potentiometer 159. Negative pulses are applied to the control grid 165 from the anode 152 and positive pulses appear at the anode 162. When the push button switch 174 is closed, the circuit from the anode 162 to the capacitor 172 is completed and the capacitor 172 begins to charge at a rate determined by the pulse repetition rate. At the same time, the push button switch 183 is closed and the circuit from the battery 79 to the capacitor 175 is completed allowing the capacitor 175 to charge at a rate determined by the position of the selector switch 181. Also, the push button switch 177 is opened and the meter 176 is placed across the two capacitors 172 and 175. The meter 176 indicates which of the two capacitors 175 or 172 is charging at the higher rate and the position of the selector switch 181 is changed until the charging rates of the two capacitors 172 and 175 are substantially equal. The strength of the radiation field can be read from a calibrated dial (not shown) adjacent the switch 181. It is to be understood that this circuit is not limited to three positions of the selector switch 181 and three resistors 178, 179, and 180 and that any number of resistors and positions of the selector switch may be used. This instrument may be calibrated by substituting a standard pulse generator for the battery 79.

The circuits of this invention are particularly applicable to portable radiation detectors since they are of simple construction and are completely self-contained.

Obviously many modifications and variations of the present invention are possible in the light of the above teachings. It is therefore to be understood that within the scope of the appended claims the invention may be practiced otherwise than as specifically described.

What is claimed is:

1. In a nuclear radiation detector in which a photomultiplier tube responsive to light from a phosphor transducer exposed to the nuclear radiation creates voltage pulses at a rate proportional to the strength of said radiation, a voltage amplifier coupled to the output of said photomultiplier tube, a voltage discriminator connected to said amplifier to pass pulses exceeding a predetermined minimum amplitude, said voltage discriminator comprising a negatively biased voltage amplifier, an indicator comprising a meter and a parallel integrating capacitor connected to said voltage discriminator to indicate the strength of said radiations, and a power supply for said photomultiplier tube, said power supply comprising a battery having a positive terminal and a negative terminal, an oscillator tube having at least a cathode, a control grid, and an anode, a transformer having a first transformer winding connected between said anode and said positive terminal and a second transformer winding connected between said control grid and said negative terminal, a rectifier, and a voltage regulator tube having one electrode connected through the rectifier to said anode and having its other electrode connected to the oscillator tube cathode and said negative terminal.

2. The radiation detector defined in claim 1 in which said voltage discriminator comprises an electron tube having a control grid, said control grid being connected to said amplifier to receive signals therefrom, a source of negative voltage, and a variable resistor connected between said source and said control grid whereby the setting of said variable resistor determines the signal voltage at which said electron tube conducts.

3. In a charged particle radiation detector employing a photomultiplier tube to create pulses the rate of which is proportional to the strength of said radiation; a battery operated power supply for said photomultiplier tube; and a counter coupled to said photomultiplier tube and responsive to said pulses, said counter comprising a first electron tube having a first anode, a first cathode and a first control grid; a second electron tube having a second anode, a second cathode and a second control grid; a first resistor connected in parallel with a first capacitor and connected between said second anode and said first control grid; a switch comprising a first, a second, a third and a movable contact; a second, a third and a fourth capacitor each having a first end connected to said first anode and a second end connected to said first, said second and said third switch contact respectively; said movable switch contact connected to said second control grid and arranged to engage said first, second and third switch contacts; a source of negative voltage connected to said second control grid to render said second electron tube normally non-conducting; said first electron tube being normally conducting; said pulses rendering said first electron tube non-conducting and said second electron tube conducting; a meter in series with said second anode to indicate whenever said second electron tube conducts; and an integrating capacitor connected in parallel with said meter to store energy whereby said meter indicates a steady amount.

4. The radiation detector defined in claim 3 further including a battery for supplying energy to said counter circuit, and a voltage compensating means to compensate for a decrease in voltage output of said battery due to aging, said compensating means comprising four resistors connected in bridge fashion, one said resistor being a variable resistor, means for impressing across said variable resistor a negative voltage from said photomultiplier tube, means for impressing across said variable resistor a negative voltage from said battery opposing said voltage from said photomultiplier, and means for impressing the difference voltage on said second control grid as a bias.

5. In a nuclear radiation counter, the combination comprising a photomultiplier tube having a cathode and a plurality of dynodes, a battery having positive and negative terminals, a power supply operated by the battery and including a blocking oscillator tube having at least a cathode, a control grid, and an anode, a transformer having a first winding connected between said anode and said positive terminal and a second winding connected between said control grid and said negative terminal, a rectifier, and a voltage regulator tube having one electrode connected through the rectifier to said anode and having its other electrode connected to an oscillator tube cathode and said negative terminal for providing a high voltage output, a voltage divider connected across the high voltage output for impressing operating potentials across the photomultiplier tube, a count indicating circuit including electronic tubes requiring plate and bias voltages, circuit means connecting said battery for supplying the plate and bias voltages to said electronic tubes, and an isolating transformer coupling the output of the photomultiplier tube to the count indicating circuit.

6. The radiation counter defined in claim 5 in which said count indicating circuit includes a comparison pulse-rate counter comprising a first capacitor and a second capacitor, means for charging said first capacitor at a rate proportional to the count, means for charging said second capacitor at a calibrated rate, and means for comparing the charging rate of said first capacitor with the charging rate of said second capacitor.

7. The radiation counter defined in claim 5 wherein the count indicating circuit includes a biased multivibrator circuit the final tube of which provides current pulses whose integrated value is indicative of the count, and means for balancing the voltage across the cathode and first dynode of the photomultiplier tube against the bias of said final tube, whereby as the plate voltage of said final tube decreases due to ageing of the battery its bias voltage decreases in greater proportion to cause its output current to remain substantially constant.

8. In a nuclear radiation detector including a photomultiplier tube, means for providing an energizing potential for said tube comprising a battery having a positive terminal and a negative terminal, an oscillator tube having at least a cathode, a control grid, and an anode, a transformer having a first transformer winding connected between said anode and said positive terminal and a second transformer winding connected between said control grid and said negative terminal, a rectifier, and a voltage regulator tube having one electrode connected through the rectifier to said anode and having its other electrode connected to the oscillator tube cathode and said negative terminal.

References Cited in the file of this patent

UNITED STATES PATENTS

| | | |
|---|---|---|
| 2,576,661 | Wouters | Nov. 27, 1951 |
| 2,605,430 | Marcy | July 29, 1952 |
| 2,742,576 | Dandl | Apr. 17, 1956 |